Figure 3:
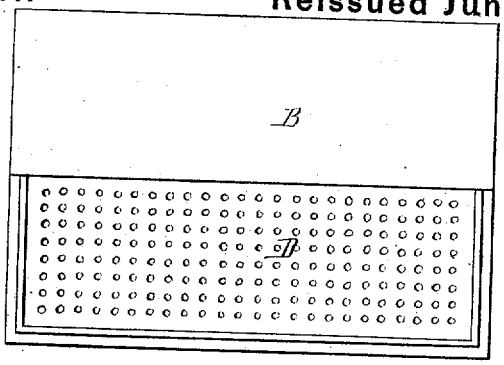

W. ADAMSON,

Assignor to J. P., E. P. & D. BAUGH.

Method of Treating Offal.

No. 8,741. Reissued June 10, 1879.

Witnesses. John M. Deemer
Thomas McIlvaine

Inventors
John P. Baugh
Edwin P. Baugh and
Daniel Baugh
by his attorneys
Howson and Son

N. PETERS, PHOTO-LITHOGRAPHER, WASHINGTON, D. C.

UNITED STATES PATENT OFFICE.

JOHN P. BAUGH, EDWIN P. BAUGH, AND DANIEL BAUGH, OF PHILADELPHIA, PENNSYLVANIA, ASSIGNEES OF WILLIAM ADAMSON.

IMPROVEMENT IN METHODS OF TREATING OFFAL.

Specification forming part of Letters Patent No. 46,318, dated February 14, 1865; Reissue No. 2,114, dated November 28, 1865; Reissue No. 8,741, dated June 10, 1879; application filed October 7, 1878.

DIVISION A.

*To all whom it may concern:*

Be it known that certain reissued Letters Patent, No. 2,114, for the treatment of offal were granted to us, JOHN P. BAUGH, EDWIN P. BAUGH, and DANIEL BAUGH, (trading under the firm-name of BAUGH & SONS,) of Philadelphia, Pennsylvania, as the assignees of WILLIAM ADAMSON, on the 28th day of November, 1865, the original Letters Patent bearing date the 14th day of February, 1865; and we do hereby declare the following to be a full, clear, and exact description of that part of the same which relates to the process, reference being had to the accompanying drawings, and to the letters of reference marked thereon.

The invention of the said WILLIAM ADAMSON consists, first, in utilizing animal offal by draining from it the greater portion of its fluid matter, which, if permitted to remain in the mass, causes fermentation and noxious exhalations, and prevents the rapid and effective drying which is necessary before the offal is rendered available as a manure.

The invention consists, secondly, in simultaneously drying and disinfecting the drained offal by subjecting it to the direct action of the products of combustion.

In order to enable others to practice the invention, we will now proceed to describe a mode of carrying it into effect.

In Chicago and other cities of the West, where vast numbers of hogs and other cattle are slaughtered, the proper disposal of the animal offal was formerly a subject of much consideration. It had hitherto been the practice to throw the offal into the rivers and creeks, to the annoyance of those living in the neighborhood, and to the detriment of the public health.

Recently, attempts were made to utilize this animal offal by converting it into a fertilizer, the offal being placed in heaps on the ground and permitted to ferment, after which it was spread out and left to dry by exposure to the air. This plan proved to be impracticable, owing to the offal being exposed without first draining from it the fluid portion preparatory to the drying, the presence of the fluid matter causing rapid fermentation and noxious and deleterious exhalations.

The accompanying drawings, which form a part of this specification, illustrate a plan by which the important preparatory step of draining the offal, and the subsequent step of disinfecting it, may be accomplished.

Figure 1:
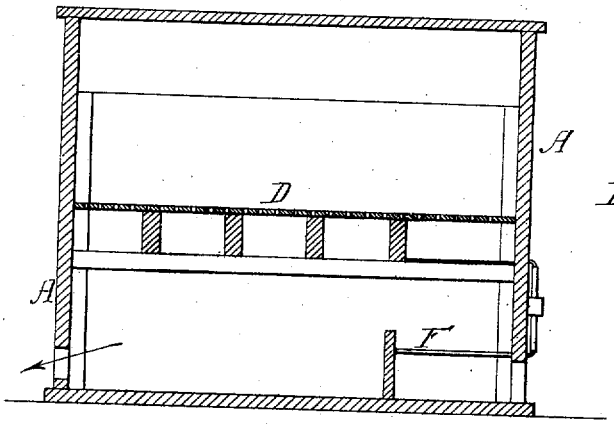
Figure 2:
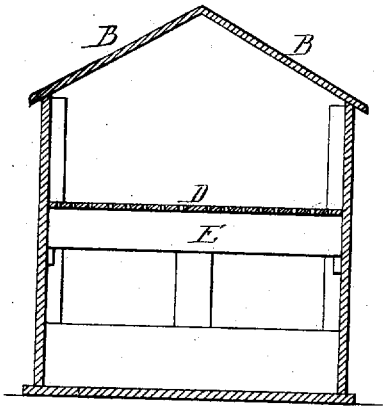

Figure 1 represents a vertical section of a building by which the invention can be carried into effect; Fig. 2, a transverse section; Fig. 3, a plan view, and Fig. 4 a modified form of building.

The building A may be either of brick, wood, or other suitable material, should be about twice as long as it is broad, and should have the usual inclined roof B, part of which is detachable for the introduction of the offal, which is deposited on a draining floor or platform, D, consisting of perforated plates, wire-netting, or grating supported by suitable joists E. Beneath the floor, and at one end of the building, is a fire-place, F, for receiving the fuel by means of which the process is in part effected.

Figure 4:
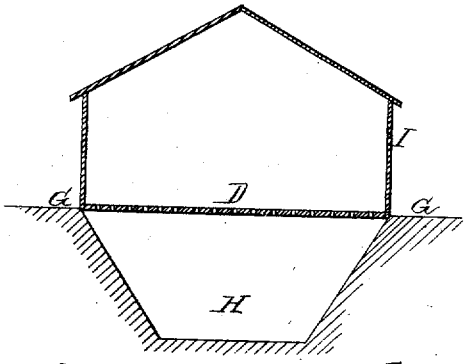

Another and more economical mode of constructing the building is that illustrated in Fig. 4, where G represents the surface of the ground, and H a trench with inclined sides, which may, if required, be simply paved or cemented; or bare ground will in some cases suffice. The grated floor or perforated platform D is in this instance on a level with the surface of the ground, and is covered by a low building, I, the roof of which, or a portion of it, is detachable.

Having deposited on the grating or floor a layer of straw or stubble, or twigs or branches of trees, a mass of animal offal from the slaughter-houses, &c., is placed on the layer and allowed to remain until the greater portion of the fluid matter is drained from it, after which the mass is subjected to the drying and disinfecting process. In order to do this, a fire is kindled in the fire-place F, and the products of combustion permitted to pervade the whole space beneath the grated floor D. The fire is continued, and the products of combustion permitted to pass through the offal, which finally becomes dry, disinfected, and ready for use as a rich manure or as a manure ingredient.

While the fire is burning, spent tan, grape-vine twigs, or other matter containing tannin, may be thrown on the fuel from time to time, for the smoke and fumes from such substances have rapid and certain disinfecting properties.

By the above-described processes all offal hitherto discarded and heretofore deemed a nuisance and a matter difficult to dispose of can be converted into manure at a very trifling cost compared with its value as a fertilizer.

It will be evident that in some climates the drying of the drained offal may be effected without the aid of fuel, simple exposure to a dry atmosphere being sufficient to reduce the offal to a condition fit for manure or for conversion into phosphate.

It will be evident, too, that the buildings for carrying out the process may be varied as regards form and construction without departing from the main features of the invention. The fire-place, for instance, may be at a distance, and the products of combustion conveyed along suitable passages to the space beneath the grated floor.

We claim as the invention of the said WILLIAM ADAMSON and desire to secure by Letters Patent—

The mode described of treating animal offal, the same consisting in draining the same and drying it by subjecting it to the direct action of the products of combustion, the above-mentioned steps being conducted continuously and at one operation in a chamber, all as set forth.

In testimony whereof we have signed our names to this specification in the presence of two subscribing witnesses.

JOHN P. BAUGH.
EDWIN P. BAUGH.
DANIEL BAUGH.

Witnesses:
C. H. TIERS,
HARRY SMITH.